(12) United States Patent
Cron et al.

(10) Patent No.: US 12,067,091 B2
(45) Date of Patent: Aug. 20, 2024

(54) HARDWARE-BASED OBFUSCATION OF DIGITAL DATA

(71) Applicant: SYNOPSYS, INC., Sunnyvale, CA (US)

(72) Inventors: Adam David Cron, Hilton Head Island, SC (US); Andrew Elias, Ottawa (CA); Bandi Chandra Sekhar Reddy, Union City, CA (US); Michael Borza, Ottawa (CA)

(73) Assignee: SYNOPSYS, INC., Sunnyvale, CA (US)

( * ) Notice: Subject to any disclaimer, the term of this patent is extended or adjusted under 35 U.S.C. 154(b) by 128 days.

(21) Appl. No.: 17/558,389

(22) Filed: Dec. 21, 2021

(65) Prior Publication Data

US 2022/0197982 A1 Jun. 23, 2022

Related U.S. Application Data

(60) Provisional application No. 63/129,354, filed on Dec. 22, 2020.

(51) Int. Cl.
*H04L 29/00* (2006.01)
*G06F 21/14* (2013.01)
*G06F 21/73* (2013.01)

(52) U.S. Cl.
CPC .............. *G06F 21/14* (2013.01); *G06F 21/73* (2013.01)

(58) Field of Classification Search
CPC .................................. G06F 21/14; G06F 21/73
USPC ............................................................ 726/26
See application file for complete search history.

(56) References Cited

U.S. PATENT DOCUMENTS

| | | | | |
|---|---|---|---|---|
| 5,231,314 | A * | 7/1993 | Andrews | H03M 1/82 |
| | | | | 714/724 |
| 10,554,422 | B2 * | 2/2020 | Yano | G11C 29/00 |
| 2016/0149697 | A1 * | 5/2016 | Doege | G09C 1/00 |
| | | | | 713/189 |

* cited by examiner

*Primary Examiner* — Brandon Hoffman
*Assistant Examiner* — Michael D Anderson
(74) *Attorney, Agent, or Firm* — LEWIS ROCA ROTHGERBER CHRISTIE LLP

(57) ABSTRACT

Some aspects of this disclosure are directed to implementing hardware-based obfuscation of digital data. For example, some aspects of this disclosure relate to a method, including performing a capture operation that loads a plurality of primary input (PI) bits into corresponding shift registers of a plurality of test data registers (TDRs) disposed on one or more digital semiconductor devices and configured to store a plurality of secret information bits. The method further includes performing a sequence of shift operations on the plurality of TDRs to obtain a plurality of output bits. The method further includes applying, by an authenticating processor, a derivation function on the plurality of output bits to extract the plurality of secret information bits thereby authenticating the one or more digital semiconductor devices.

17 Claims, 7 Drawing Sheets

HARDWARE-BASED OBFUSCATION OF DIGITAL DATA

RELATED APPLICATION

This application claims the benefit of U.S. Provisional Patent Appl. No. 63/129,354, filed Dec. 22, 2020, and entitled "HARDWARE-BASED OBFUSCATION OF DIGITAL DATA," and is incorporated herein in its entirety.

GOVERNMENT LICENSE RIGHTS

This invention was made with government support under Contract No. HR0011-20-9-0043 awarded by the United States (U.S.) Defense Advanced Research Projects Agency (DARPA). The U.S. government has certain rights in the invention.

TECHNICAL FIELD

The present disclosure generally relates to an electronic design automation (EDA) system. In particular, the present disclosure relates to a system and method for providing obfuscation of digital information in hardware.

BACKGROUND

Hardware manufacturers may embed secret information such as a symmetric cryptographic key or a seed for a cryptographic key generator into system on a chip (SoC) architectures. These secrets may be used to test or verify the authenticity of the SoC to one or more external devices, such as on a manufacturing floor. Such test or verification may be done after SoC fabrication and before any provisioning on the manufacturing floor. For example, these secrets may be one or more key materials that may be used in a protocol to authenticate with a hardware security module (HSM) on the manufacturing floor. This protocol (along with the secrets) may be used for establishing evidence that the SoC and HSM are able to perform a subsequent step in the provisioning process.

Hiding or obfuscating these secrets is a challenge for most makers. In order to maintain a higher level of security, obfuscation methods are often treated as confidential and proprietary.

SUMMARY

Some aspects of this disclosure relate to a method for implementing hardware-based obfuscation of digital data. For example, some aspects of this disclosure include performing a capture operation that loads a plurality of primary input (PI) bits into corresponding shift registers of a plurality of test data registers (TDRs) disposed on one or more digital semiconductor devices and configured to store a plurality of secret information bits. The method further includes performing a sequence of shift operations on the plurality of TDRs to obtain a plurality of output bits. The method further includes applying, by an authenticating processor, a derivation function on the plurality of output bits to extract the plurality of secret information bits thereby authenticating the one or more digital semiconductor devices.

According to some aspects a PI port of a first TDR of the plurality of TDRs is set to a logic high or a logic low based at least in part on the plurality of secret information bits. According to some aspects, a PI port and a primary output (PO) port of a first TDR of the plurality of TDRs are connected to a network of digital logic gates. According to some aspects, the derivation function is based at least in part on the network of digital logic gates. According to some aspects, the applying the derivation function includes using a bit mapping list to reorder the plurality of output bits. According to some aspects, the bit mapping list is based at least in part on addresses of the plurality of TDRs. According to some aspects, the plurality of secret information bits are a cryptographic key or a seed for a cryptographic key generator Some aspects of this disclosure relate to a system for implementing hardware-based obfuscation of digital data. For example, some aspects of this disclosure relate to a memory storing instructions, and at least one processor, coupled with the memory and to execute the instructions. According to some aspects, the instructions, when executed, cause the at least one processor to perform a capture operation that loads a plurality of primary input (PI) bits into corresponding shift registers of a plurality of test data registers (TDRs) disposed on one or more digital semiconductor devices and configured to store a plurality of secret information bits. According to some aspects, the instructions, when executed, further cause the processor to perform a sequence of shift operations on the plurality of TDRs to obtain a plurality of output bits. According to some aspects, the instructions, when executed, further cause the processor to apply a derivation function on the plurality of output bits to extract the plurality of secret information.

Some aspects of this disclosure relate to a non-transitory computer readable medium including stored instructions, which, when executed by a processor, cause the processor to perform a capture operation that loads a plurality of primary input (PI) bits into corresponding shift registers of a plurality of test data registers (TDRs) disposed on one or more digital semiconductor devices and configured to store a plurality of secret information bits. According to some aspects, the instructions when executed cause the processor to apply a derivation function on a plurality of output bits obtained from the plurality of TDRs to extract the plurality of secret information bits thereby authenticating the one or more digital semiconductor devices.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
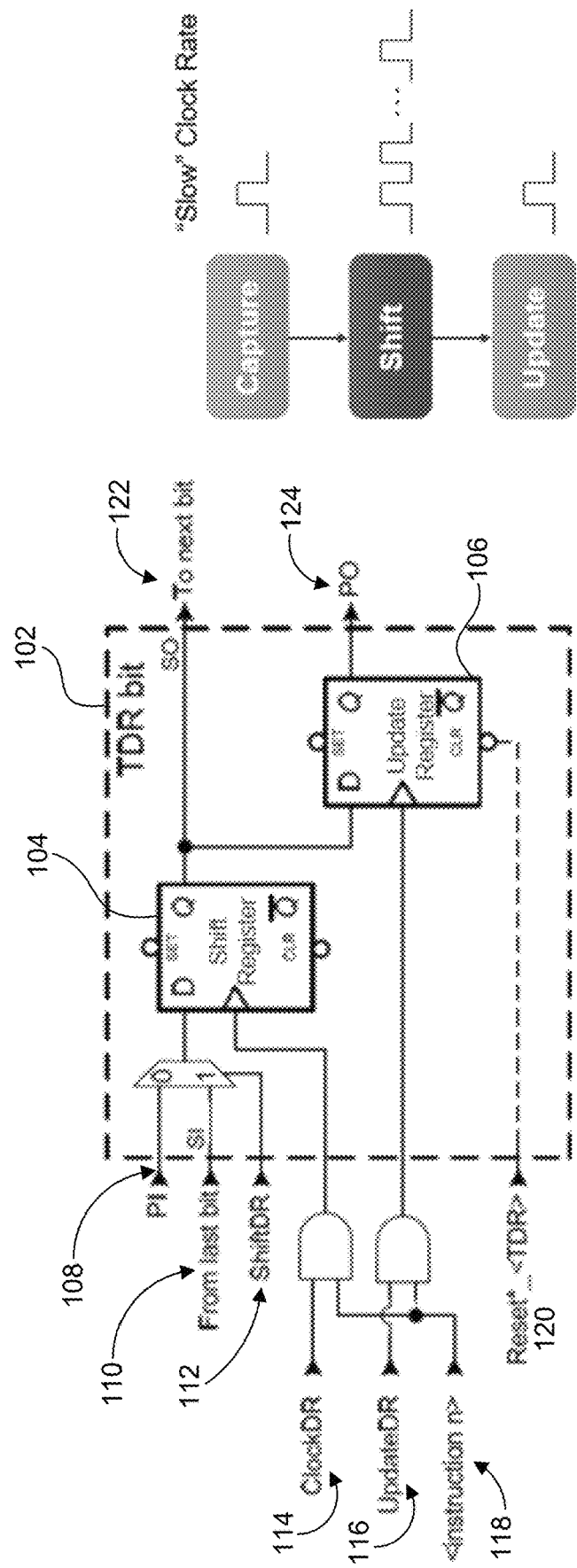
FIG. 1 illustrates an exemplary test data register (TDR) bit, according to some aspects.

Aspects of the present disclosure relate to hardware-based obfuscation of digital data.

There is a need to use and hide cryptographic keys stored in hardware devices (e.g., digital circuitry), in order to establish trust between a device and its external security infrastructure. An un-provisioned system on a chip (SoC) (e.g., a SoC immediately after fabrication that has not been attested or authenticated) may establish some level of trust with an external device, such as via some form of authentication/attestation, in some embodiments. One way to do so is to hide key material in the SoC that may be tested using protocols with an external device such as an HSM, avoiding reliance on a third-party source of trust.

The present disclosure provides an automated means to obfuscate or hide a key, set of keys, or other secret data, in digital circuitry, such as within a semiconductor device, using a multi-layered approach.

According to some aspects, bits of secret information may be hidden in the capture value of a test data register (TDR). See, e.g., Joint Test Action Group (JTAG), Institute of Electrical and Electronics Engineers (IEEE) Standard IEEE 1149.1-2013, FIG. 9-6 (PI input). These inputs may go unused in some TDRs, allowing a circuit designer or engineer to set any of these digital inputs to a constant value, e.g., logic 1 or logic 0, without affecting the main circuit design, for example.

According to some aspects, hidden secret information bits may be placed in various physical locations around a device (e.g., SoC, semiconductor device, multi-chip module (MCM), integrated circuit (IC), or other digital devices). Hidden information bits may be integrated into a randomly configured fixed-valued cloud of logic on-board a given circuit layout. Such a cloud of logic may also be spread around multiple physical locations during a layout process, which may render the logic cloud more difficult to be identified or revealed following a reverse-engineering process, such as delamination, for example. Other unused capture values may be randomized in such a way as to obscure useful and non-useful circuit elements. A sequence in which the bits are processed by an authenticating client may also be maintained in secrecy.

Embodiments of the present disclosure provide the technical advantage of preventing hardware-based attacks (e.g., delamination or other side-channel attacks) that may allow an attacker to gain unauthorized access to private cryptographic-key information. Embodiments here in also provide the technical advantage of hiding secret key bits in a SoC using the SoC test infrastructure facility thereby making it very hard to reverse engineer the circuits to reveal the secret bits on the SOC. Embodiments herein also provide the technical advantage of randomly hiding secret key bits in a SoC such that different SoCs using this method will generate different patterns for hiding the bits, thereby mitigating the scenario where breaking a key corresponding to a single SoC during reverse engineering attempts results in keys corresponding to all other SoC being compromised.

FIG. 1 illustrates an exemplary test data register (TDR) bit, according to some aspects. A TDR 102 includes a shift register 104 and an update register 106. According to some aspects, shift register 104 and update register 106 are digital flip-flops (e.g., D-type flip-flops). According to some aspects, test data register TDR 102 conforms to the JTAG IEEE 1149.1-2013 standard specification. The signals named in FIG. 1 are consistent with naming conventions used for these types of registers as defined in IEEE 1149.1 referenced and described elsewhere herein. Test data register TDR has three modes of operation: capture mode, shift mode, and update mode. According to some aspects, during capture mode, primary input (PI) 108 can be routed to shift register 104. At a rising edge of the clock data register (DR) signal, the value of PI 108 can be captured into shift register 104 and the value previously stored in shift register can be shifted out as scan out (SO) 122 output.

According to some aspects, during shift mode, SO 122 can be passed to scan in (SI) input 110 of the next TDR bit. During update mode, at a rising edge of update data register (DR) 116 signal, the value stored in update register 106 can be passed to the primary output (PO) 124 and the value of SO 122 of shift register 104 can be stored in update register 106.

According to some aspects, at power-up reset 120 signal may be asserted and de-asserted to clear the update register 106. Thereafter PO 124 may be used to form PI input of TDR 102 or another TDR on the semiconductor device. Instruction 118 may act as a switch to trigger shift register 104 and update register 106. Clock DR 114 can trigger shift register 104, and update DR 116 can trigger update register 106 when instruction 118 is set to a logic high. Further, clock DR 114 cannot trigger shift register 104, and update DR 116 cannot trigger update register 106 when instruction 118 is set to a logic low.

Because of the nature of the use of TDRs by Electronic Design Automation (EDA) applications such as a design-for-test (DFT) system, the capture mode and the captured or observed value may seldom be used. However, a capture event at shift register 104 may still occur, but in some cases, no circuitry may respond to the event, or a static value may be captured in the shift element of the TDR, or the value may hold state during that event, or a DFT observation may be made to help debug failures in the TDR circuit itself, to name a few non-limiting examples. The present system may make use of such an observation point to obfuscate or hide secret information, such as a cryptographic key or a seed for a cryptographic key generator. Moreover, in an example use case, a private key, such as a symmetric key (e.g., Advanced Encryption Standard (AES)) or asymmetric private key (e.g., elliptic-curve cryptography) may be hidden in a given device and used in order to begin establishing trust between the given device and its security infrastructure (internal and external).

According to some aspects, update registers of TDR bits may reset upon power-up or assertion of the test access port (TAP) reset. If no update register is supplied in the TDR, as is sometimes the case for some implementations, then the shift register 104 may reset and drive PO directly from its Q output.

Figure 2:
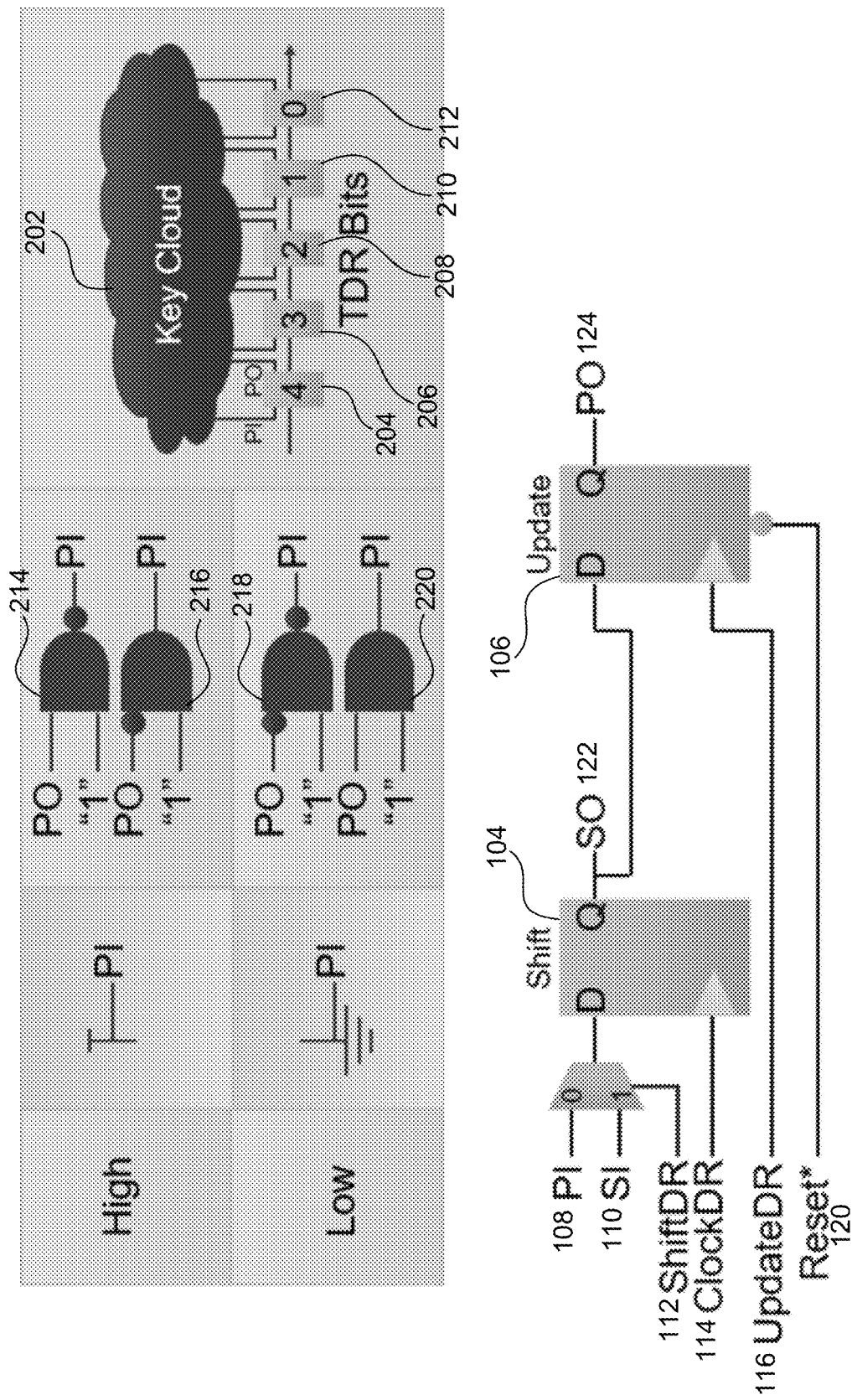
FIG. 2 illustrates exemplary approaches of sourcing primary input (PI) of a TDR, according to some aspects.

FIG. 2 illustrates exemplary approaches of sourcing PI input of a TDR, according to some aspects. PI 108 of a TDR can be set to a logic high or a logic low. According to some aspects, a digital semiconductor device may contain multiple TDRs, and a subset of TDRs may be repurposed to obfuscate or hide secret information. The PI values of the subset of TDRs on the semiconductor device may be set to a logic high or a logic low according to a predetermined scheme.

According to some aspects, PI values may be obtained from a cloud of logic (the key cloud 202). FIG. 2 shows TDRs 204-212 with PI inputs derived from key cloud 202, and the primary outputs (the POs) of the TDRs are input back to key cloud 214. According to some aspects, key cloud 214 may include various digital logic gates (e.g., NAND and NOR gates such as 214-220. Accordingly, key cloud 202 may be a network of digital logic gates. According to some aspects, key cloud 202 may be a predefined circuit such that given a value of PO that is input into key cloud 202 and the structure of the key cloud 202, the value of PI that is output may be determined. According to some aspects, key cloud 214 may be a subcomponent of the semiconductor device on which TDRs 204-212 are disposed. According to some aspects, key cloud 214 may be a network of digital logic gates disposed on a digital semiconductor devices having the TDRs 204-212. In key cloud 202, PO of a TDR and a signal value (e.g., a logic high "1") may be input to a digital logic gate to generate a next PI value. The generated next PI value may subsequently be used to drive a primary input of another TDR. For example, PO of TDR 4 204 may be combined with a logic high level using digital gate 216 to generate PI that may be input to TDR3 206.

According to some aspects, a subset of TDRs (e.g., TDRs 204-212) on a semiconductor device may be selected for hiding secret information bits. Each TDR may store a single information bit. The subset of TDR may be driven by a security engine or an authentication processor that performs a sequence of operations (e.g., capture, shift, and update) to access the information bits that are stored in the subset of TDRs. According to some aspects, security engine or the authentication processor driving the subset of TDRs may correspond to components of test infrastructures defined in IEEE standard 1149.1, 1500 or 1687. The subset of TDRs may be connected in tandem such that SO of TDR 204 is connected to SI of TDR 206, SO of TDR 206 is connected to SI of TDR 208, SO of TDR 208 is connected to SI of TDR 210, and SO of TDR 210 is connected to SI of TDR 212. According to some aspects, the PI input of each TDR of the subset of TDRs may be set to a logic high or a logic low. According to some aspects, the PI input of each TDR of the subset of TDRs may be sourced from key cloud 202. According to some aspects, a capture operation may be performed over the subset of TDRs to load the PI input of each TDR into the shift register of the respective TDR. Subsequently, a sequence of shift operations may be performed on the TDRs to scan out the bits stored in the subset of TDRs.

Figure 3:
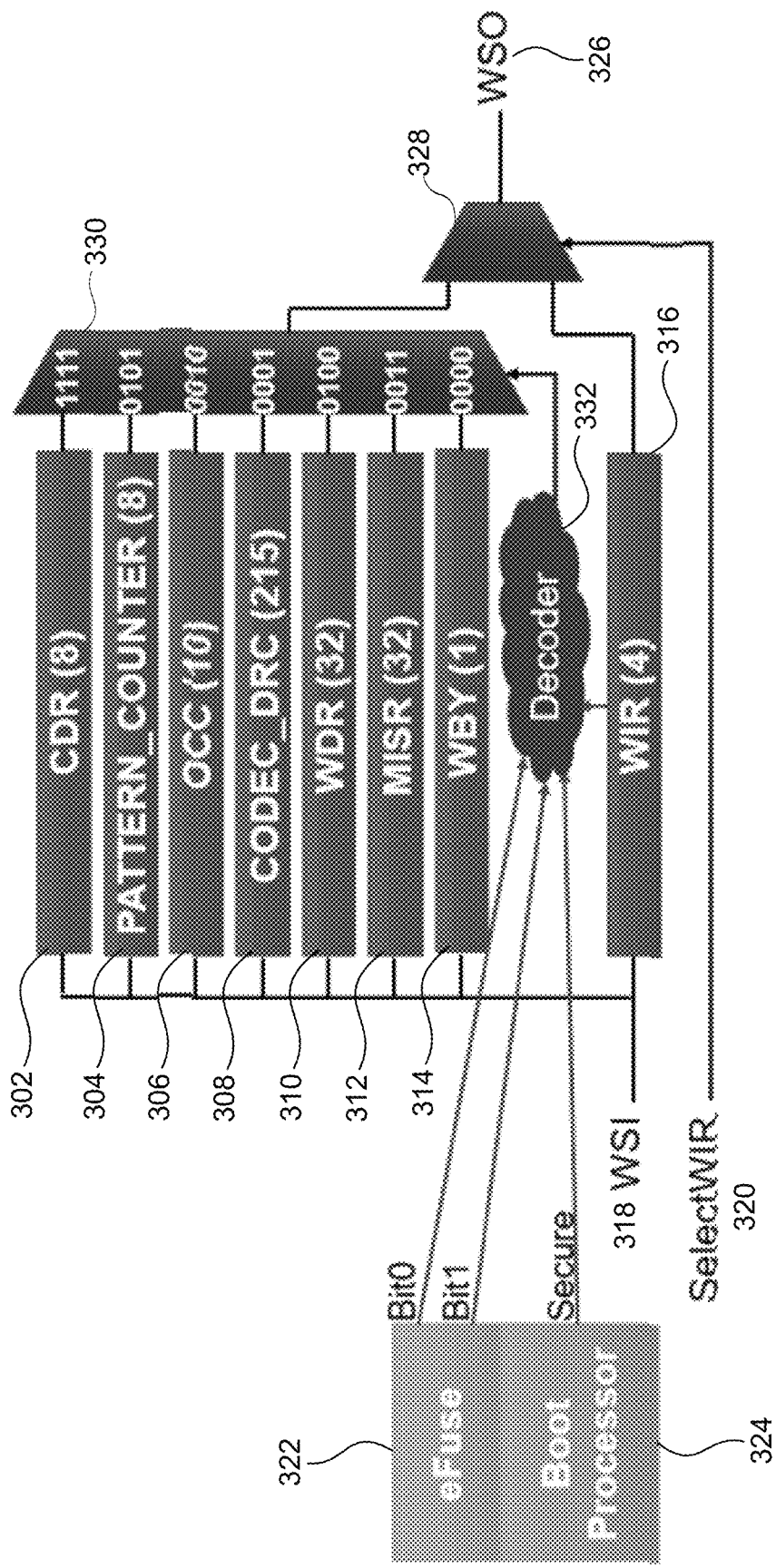
FIG. 3 illustrates an exemplary topology of registers in a test infrastructure of a semiconductor device, according to some aspects.

FIG. 3 illustrates a topology of registers in a test infrastructure of a semiconductor device (e.g., a JTAG enabled device), according to some aspects. Further, FIG. 3 shows that access to the particular TDR bits containing some of the secret information bits may be blocked from access by security-policy bits driving address decoding to a TDR of interest. The background of FIG. 3 involves an embodiment of an access architecture found in cores of SoCs adhering to IEEE 1500 Standard for Embedded Core Test (SECT), for example, with a few modifications.

Data may be serially scanned through the IEEE 1500 SECT core along the pathway from the wrapper serial input (WSI) 318 to wrapper serial output (WSO) 326. In a typical application, an address may be loaded into the wrapper instruction register (WIR) 316 when the SelectWIR 320 signal is asserted at multiplexer 328. The WIR 316 then may select a data register to scan through when the SelectWIR is de-asserted. In some use cases, there may be no decoder block. The WIR 316 may select a register to be addressed (e.g., registers 302-314). For example, when a value of "0000" is loaded into the WIR 316, the WBY register 314 may then be selected at multiplexer 330. According to some aspects, a decoder cloud of logic 332 feeds the address from the WIR 316, with the additional signaling coming from a security policy generator of a test network access infrastructure. Bits of this policy may include output of eFuse 322 (e.g., "bit0" and "bit1" of eFuse) from the SoC and control signals ("secure") from a security engine or boot processor 324, to name a few non-limiting examples. According to some aspects, eFuse 322 may be an integrated circuit that controls the on and off of the power supply and boot processor may be an integrated circuit that executes a bootloader program such as a grand unified bootloader (GRUB) or a Linux Loader (LILO). According to some aspects, access to the particular register holding secret values or bits may be blocked, pending some authorization scheme from a policy engine of the SoC. According to some aspects, the policy engine may be implemented on the semiconductor device as part of test network access infrastructure security engine 408. Additionally, implementations of registers 302-314 may include at least one linear-feedback shift register (LFSR), according to some embodiments. In another implementation, the LFSR may be replaced by a pseudorandom number generator (PRNG) or cryptographic primitive such as a stream cipher or hash function.

Figure 4:
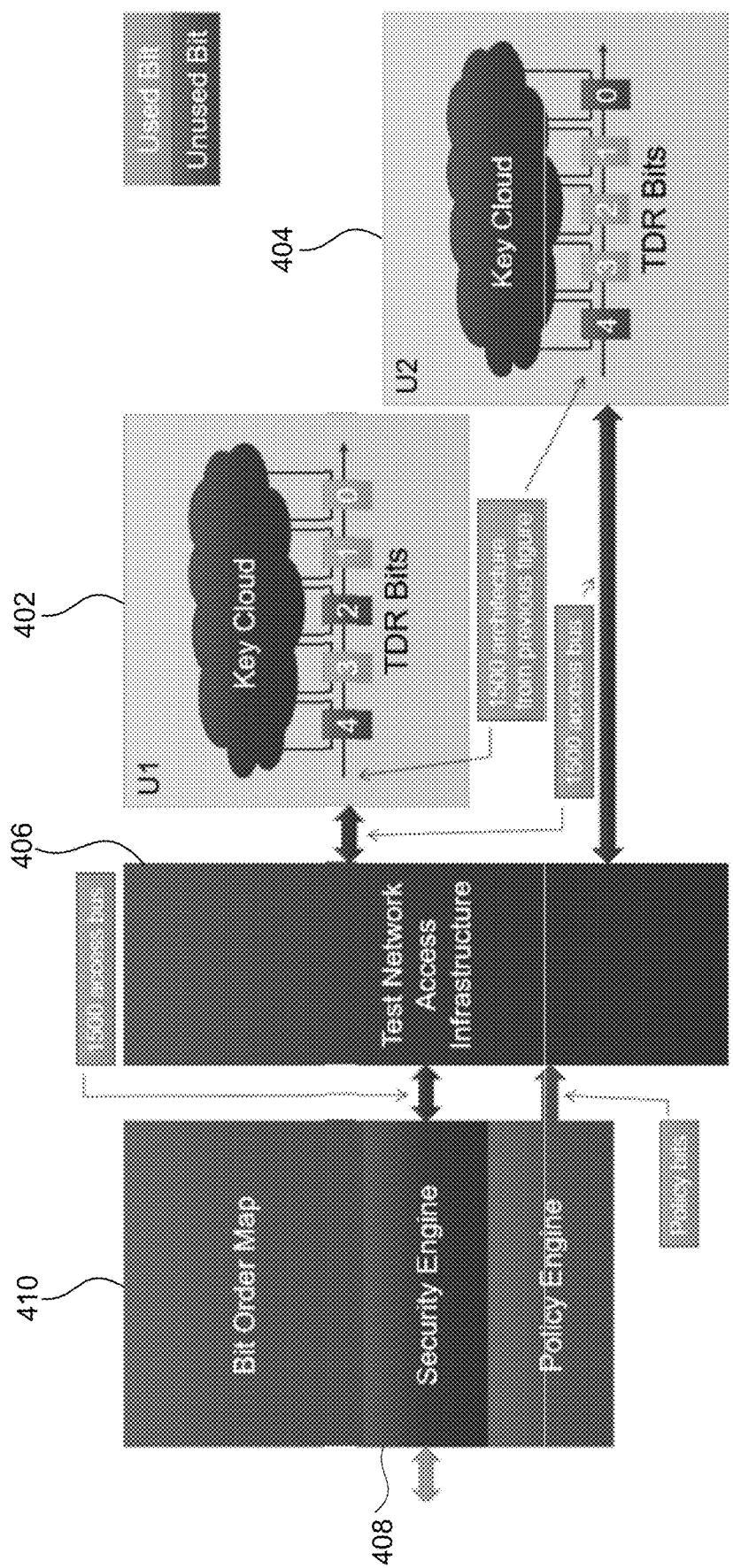
FIG. 4 illustrates multiple components of an electronic system connected to a test network access infrastructure, according to some aspects.

FIG. 4 illustrates multiple components of an electronic system connected to a test network access infrastructure, according to some aspects. Components U1 402 and U2 404 may be different hierarchical modules, chips in a multi-chip module, or logical portions of a semiconductor device. According to some aspects, U1 402 and U2 404 may include several TDRs. A subset of TDRs on each component may be repurposed to obfuscate or hide secret information bits. The subset of TDRs may be selected based on a predefined bit order map 410 comprising a bit mapping list. For example, of the five TDRs in U1 402, three TDRs (TDRs 3, 1, and 0) are used to hide secret information bits. Further in this example, of the five TDRs in U2 404, three TDRs (TDRs 1, 2, 3) are used to hide secret information bits.

According to some aspects, a subset of TDRs on each module is selected, and a bit mapping list may be generated based on the selected TDRs. In some embodiments, the bit mapping list may include the identity of the selected TDRs, the location of the selected TDRs, and an order of the selected TDRs. In some embodiments, the bit mapping list 410 may include addresses of the selected TDRs. In some embodiments, the bit mapping list is created based on key cloud 202 which is a network of digital logic gates.

Using FIG. 4 to illustrate a system, an accompanying process may work as follows, according to some aspects:

The subsets of selected TDRs on U1 402 and U2 404 may enter a reset state upon power-up (for example). The security engine 408 may be provided with a bit mapping list of bit order map 410 based on which a sunset of TDRs on U1 402 and U2 404 are selected. The security engine 408 may determine which TDRs may need to be accessed to extract the hidden information bits. The security engine 408 may allow access to the registers (e.g., registers 302-314) by setting policy bits that enable security engine 408 to command test network access infrastructure 406 to select one of the register 320-314. Selection may require accessing the test network access infrastructure 406 to set the WIR of the core to an appropriate address. Assertion of clock DR signal may trigger a capture operation whereby the PI input of each TDR is loaded into the shift register of the respective TDR, as described in FIG. 1. Subsequently, a sequence of shift operations may be performed on the TDRs to scan out the bits stored in the subset of TDRs. A derivation function, which is based on the corresponding bit order map 410, may be applied over the scanned-out bits to obtain the hidden information bits. According to some aspects, applying the derivation function may involve unscrambling the scanned-out bits based on bit order map 410. According to some aspects, applying the derivation function to obtain the hidden information bit may involve deleting one or more bits of the scanned-out bits, where the deleted bits may correspond to the unused TDR bits in U1 402 and U2 404. Security engine 408 may then change the policy bits to lock out access to the TDR. Security engine 408 may continue extracting bits until a desired string of information bits are extracted, according to some aspects.

Figure 5:
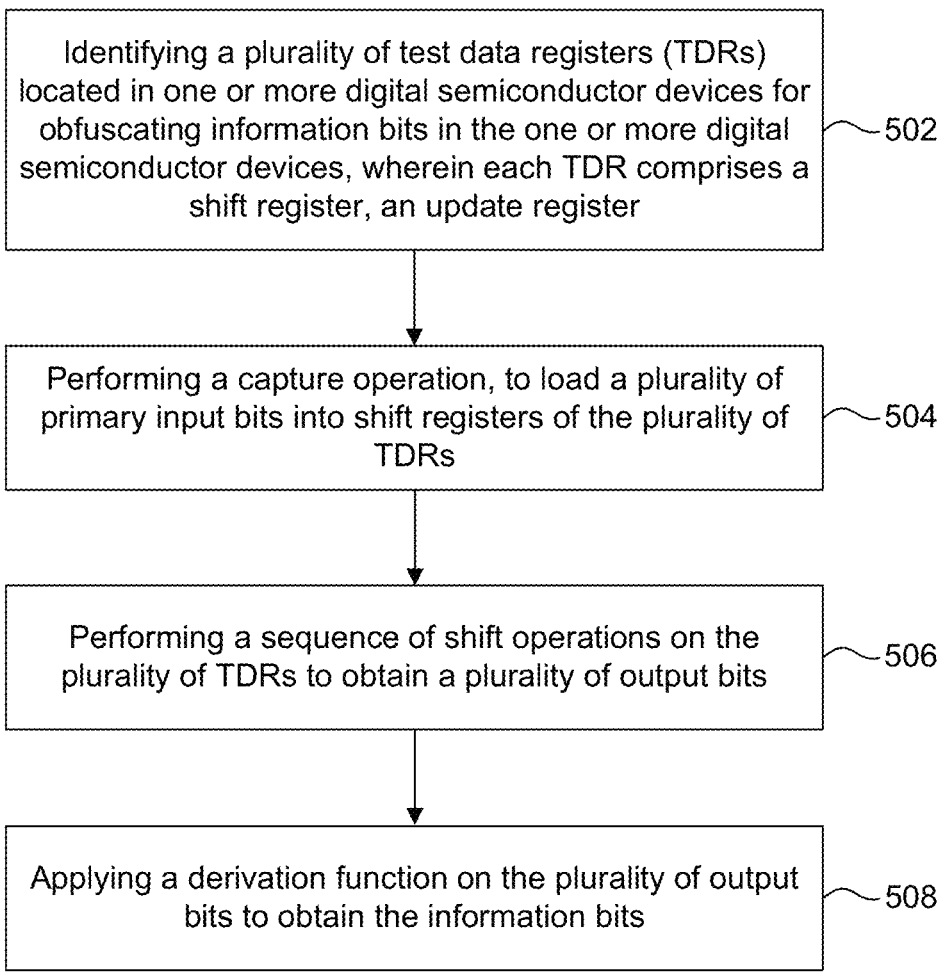
FIG. 5 illustrates an example method for performing hardware-based obfuscation of digital data, according to some aspects.

FIG. 5 illustrates an example method for performing hardware-based obfuscation of digital data, according to some aspects. FIG. 5 may be described with regard to elements of FIGS. 1-4. Method 500 may be performed by computer system 600 of FIG. 6. Method 500 may be performed using the TDR bit illustrated in FIG. 1. Method 500 may be performed using the semiconductor components shown in FIGS. 2-4. Method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, TDRs located on one or more digital semiconductor devices are identified for obfuscating or hiding secret information bits. According to some aspects, a digital semiconductor device may contain several TDRs, and a subset of TDRs may be used to hide information bits. Based on the selected subset of TDRs, a bit mapping list may be created. In some embodiments, the bit mapping list may include the addresses of the selected TDRs, the location of the selected TDRs on the one or more semiconductor devices, and an order of the selected TDRs. In some embodiments, the bit mapping list may be based on a network of logic gates to which the subset of TDRs are connected.

According to some aspects, the subset of TDRs identified for hiding information bits may be connected in tandem. According to some aspects, the subset of TDRs identified for hiding information bits may be nonadjacent to each other or may be located on different logical portions of the one or more semiconductor devices.

At 504, a capture operation is performed to load the signal value at the PI input of each TDR of the subset of TDRs into the shift registers of the respective TDRs. According to some aspects, the PI input of each TDR of the subset of TDRs may be set to a logic high or a logic low. According to some aspects, the PI input of each TDR of the subset of TDRs may be sourced from key cloud 202. According to some aspects, the PI input of each TDR of the subset of TDRs may be based on the secret information bits.

At 506, a sequence of shift operations are performed on the plurality of TDRs to scan out a plurality of output bits. During a shift operation, a value at shift input (SI) 112 may be loaded into shift register 104, and a value at shift output (SO) 122 may be passed on to scan in (SI) input of the next TDR bit.

At 508, a derivation function is applied by a security engine or an authenticating processor on the plurality of output bits that were obtained by performing shift operations on the TDRs to extract the secret information bits that were hidden in the TDRs. According to some aspects, the security engine or the authentication processor may be part of a test network access infrastructure. Applying the derivation function may include using the bit mapping list to reorder or unscramble the plurality of output bits according to bit order map 410. Applying the derivation function may include using the bit mapping list to select a subset of the plurality of output bits corresponding to the subset of TDRs that were used to hide the secret information bits. Accordingly, applying the derivation function my include deleting one or more bits from the plurality of output bits, where the deleted bits may correspond to the unused TDR bits. According to some aspects, the derivation function may be based on the configuration of one or more key cloud circuits. According to some aspects, extracting the secret information bits authenticates the one or more digital semiconductor devices that contain the TDRs.

Figure 6:
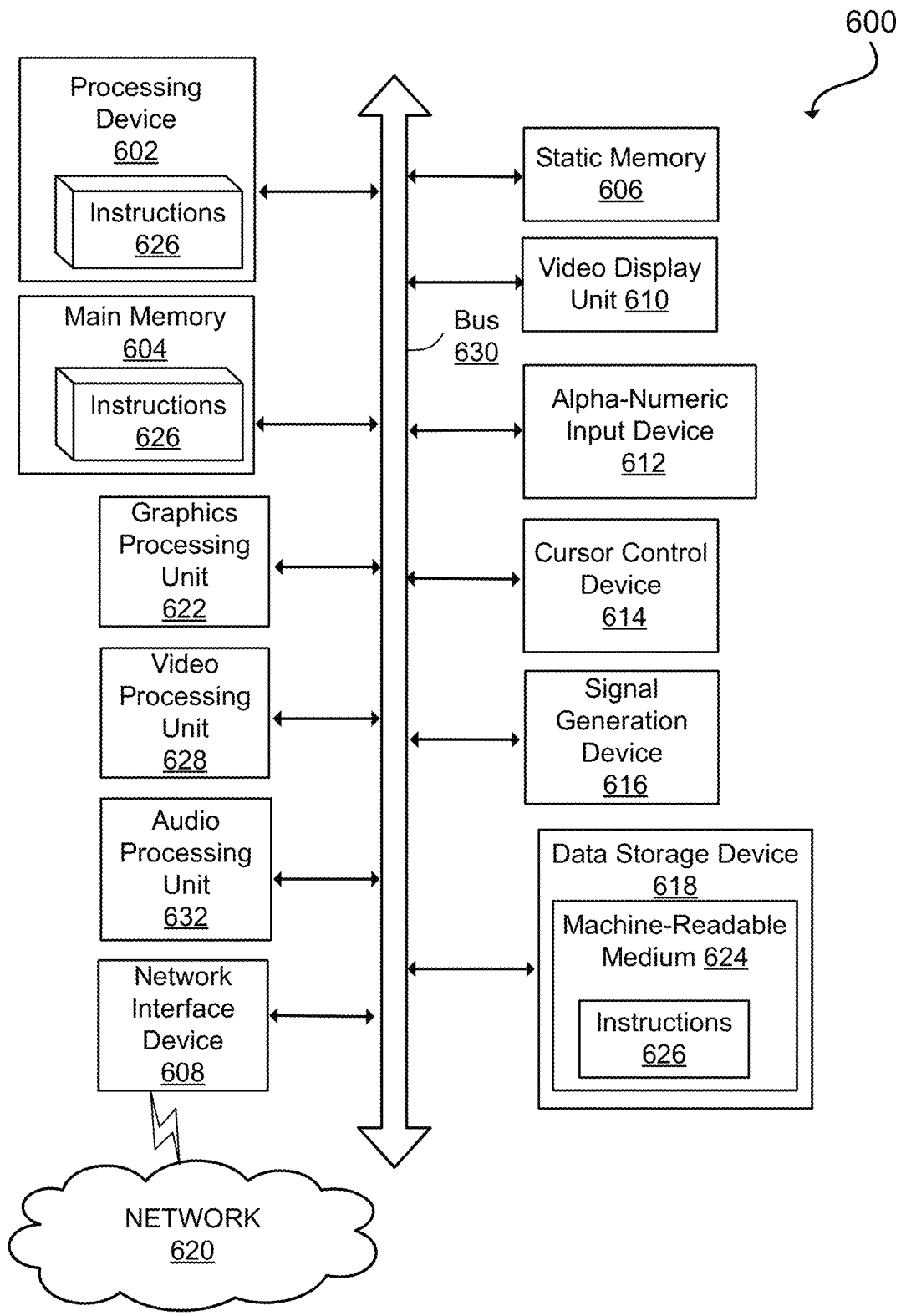
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figure 7:
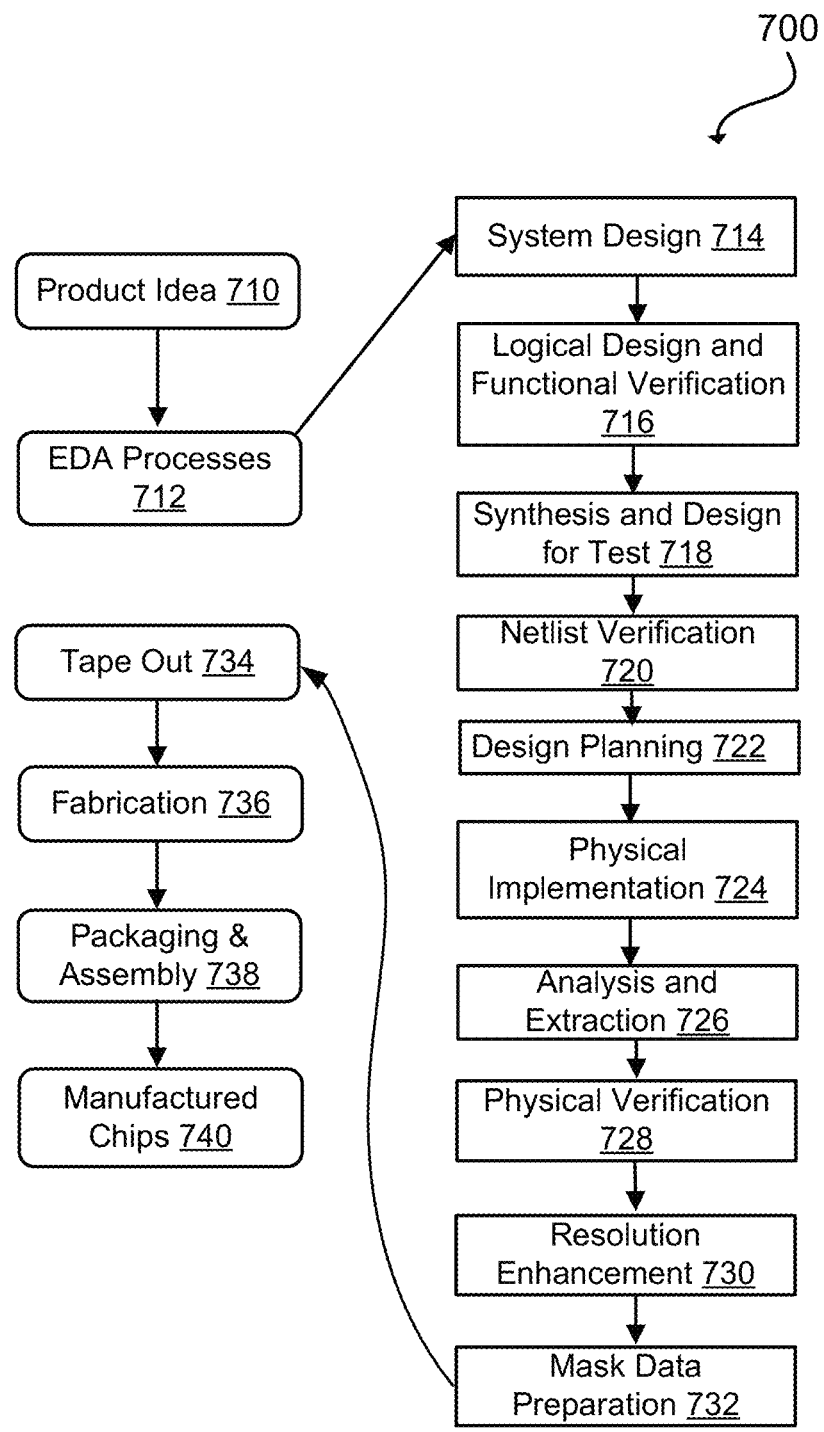
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 737 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 717, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising: performing a capture operation that loads a plurality of primary input (PI) values into corresponding shift registers of a plurality of test data registers (TDRs) disposed on one or more digital semiconductor devices and configured to store a plurality of secret information bits; performing a sequence of shift operations on the plurality of TDRs to obtain a plurality of output bits; and applying, by a processor, a derivation function on the plurality of output bits to extract the plurality of secret information bits thereby authenticating the one or more digital semiconductor devices, wherein a PI value from the plurality of PI values of a first TDR of the plurality of TDRs is set to a logic high or a logic low based at least in part on the plurality of secret information bits.

2. The method of claim 1, wherein a PI port and a primary output (PO) port of the first TDR of the plurality of TDRs are connected to a network of digital logic gates.

3. The method of claim 2, wherein a PI of a second TDR of the plurality of TDRs is based on the PO of the first TDR of the plurality of TDRs.

4. The method of claim 2, wherein the derivation function is based at least in part on the network of digital logic gates.

5. The method of claim 1, wherein the applying the derivation function comprises using a bit mapping list to reorder the plurality of output bits.

6. The method of claim 5, wherein the bit mapping list is based at least in part on addresses of the plurality of TDRs.

7. The method of claim 1, wherein the plurality of secret information bits are a cryptographic key or a seed for a cryptographic key generator.

8. A system comprising: a memory storing instructions; and at least one processor, coupled with the memory and to execute the instructions, the instructions when executed cause the at least one processor to: perform a capture operation that loads a plurality of primary input (PI) values into corresponding shift registers of a plurality of test data registers (TDRs) disposed on one or more digital semiconductor devices and configured to store a plurality of secret information bits; perform a sequence of shift operations on the plurality of TDRs to obtain a plurality of output bits; and apply a derivation function on the plurality of output bits to extract the plurality of secret information bits, wherein a PI value from the plurality of PI values of a first TDR of the plurality of TDRs is set to a logic high or a logic low based at least in part on the plurality of secret information bits.

9. The system of claim 8, wherein a PI port and a primary output (PO) port of the first TDR of the plurality of TDRs are connected to a network of digital logic gates.

10. The system of claim 9, wherein the derivation function is based at least in part on the network of digital logic gates.

11. The system of claim 8, wherein the applying the derivation function comprises using a bit mapping list to reorder the plurality of output bits.

12. The system of claim 11, wherein the bit mapping is based at least in part on addresses of the plurality of TDRs.

13. The system of claim 8, wherein the plurality of secret information bits are a cryptographic key or a seed for a cryptographic key generator.

14. A non-transitory computer readable medium (CRM) comprising stored instructions, which when executed by a processor, cause the processor to: perform a capture operation that loads a plurality of primary input (PI) values into corresponding shift registers of a plurality of test data registers (TDRs) disposed on one or more digital semiconductor devices and configured to store a plurality of secret information bits; and apply a derivation function on a plurality of output bits obtained from the plurality of TDRs to extract the plurality of secret information bits thereby authenticating the one or more digital semiconductor devices, wherein a PI value from the plurality of PI values of a first TDR of the plurality of TDRs is set to a logic high or a logic low based at least in part on the plurality of secret information bits.

15. The non-transitory CRM of claim 14, wherein a PI port and a primary output (PO) port of the first TDR of the plurality of TDRs are connected to a network of digital logic gates.

16. The non-transitory CRM of claim 15, wherein the derivation function is based at least in part on the network of digital logic gates.

17. The non-transitory CRM of claim 14, wherein the applying the derivation function comprises using a bit mapping list to reorder the plurality of output bits.

\* \* \* \* \*